United States Patent
Sun et al.

(10) Patent No.: US 9,407,316 B2
(45) Date of Patent: Aug. 2, 2016

(54) DEVICE FOR IMPROVING THE STRAY ISOLATION BETWEEN THE ANTENNAS IN THE BILATERAL ANTENNA AND THE METHOD THEREOF

(71) Applicant: SPREADTRUM COMMUNICATIONS (SHANGHAI) CO., LTD., Pudongxinqu, Shanghai (CN)

(72) Inventors: Zhongping Sun, Shanghai (CN); Wulin Shi, Shanghai (CN); Bei Ni, Shanghai (CN); Ruzhong Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 176 days.

(21) Appl. No.: 14/453,142

(22) Filed: Aug. 6, 2014

(65) Prior Publication Data
US 2015/0118975 A1    Apr. 30, 2015

(30) Foreign Application Priority Data
Oct. 24, 2013 (CN) .......................... 2013 1 0508310

(51) Int. Cl.
  *H04B 1/525* (2015.01)
(52) U.S. Cl.
  CPC ..................................... *H04B 1/525* (2013.01)
(58) Field of Classification Search
  CPC ........ G06Q 10/101; H04B 1/40; H04B 1/525; H04B 1/04; H04B 1/18; H04L 65/403; H01Q 15/0066; H03D 2200/009; H03D 7/1483
  See application file for complete search history.

(56) References Cited

U.S. PATENT DOCUMENTS

| | | | | |
|---|---|---|---|---|
| 2011/0064005 A1* | 3/2011 | Mikhemar | ............. | H04B 1/525 370/278 |
| 2011/0299431 A1* | 12/2011 | Mikhemar | ............... | H04B 1/18 370/277 |
| 2011/0299437 A1* | 12/2011 | Mikhemar | ........... | H04B 1/0458 370/278 |
| 2011/0299438 A1* | 12/2011 | Mikhemar | ............... | H04B 1/18 370/278 |
| 2011/0299885 A1* | 12/2011 | Taba | .................... | G03G 21/185 399/111 |
| 2013/0252561 A1* | 9/2013 | Alexopoulos | ...... | H01Q 15/0086 455/78 |

FOREIGN PATENT DOCUMENTS

CN          102509883 A     6/2012

\* cited by examiner

*Primary Examiner* — Sujatha Sharma
(74) *Attorney, Agent, or Firm* — Venable LLP; Steven J. Schwarz

(57) ABSTRACT

The present invention relates to the communication technology field, more specifically, to a scheme of bilateral antenna. A device for improving the stray isolation between the antennas in the bilateral antenna comprises a plurality of communication modules having an antenna and a power amplification module; at least one of the communication modules further comprises a tuning module. The power amplification module is connected to the antenna directly or through the tuning module. The stray isolation between the communication module and other communication module is improved by adjusting the communication modules comprising the tuning module. This invention increases the stray isolation between the communication modules in different frequency bands, specifically, when a long interval exits between working frequency bands. Consequently, the radiance performance of the bilateral antenna of the mobile termination is satisfied, and the capacity of resisting disturbance between the systems is enhanced.

18 Claims, 2 Drawing Sheets

DEVICE FOR IMPROVING THE STRAY ISOLATION BETWEEN THE ANTENNAS IN THE BILATERAL ANTENNA AND THE METHOD THEREOF

CROSS-REFERENCE TO RELATED APPLICATIONS

The present application claims priority to and the benefit of Chinese Patent Application No. CN 201310508310. X, filed on Oct. 24, 2013, the entire content of which is incorporated herein by reference.

BACKGROUND OF THE INVENTION

1. Field of the Invention

The present invention relates to the field of communication technology, more specifically, to a scheme of bilateral antenna.

2. Description of the Related Art

With the rising of the demand of consumers and the development of manufacturing technology, the mobile termination, such as mobile phone and laptop, trends to shorter and thinner. Meanwhile, the wireless transmission function including voice and data transmission has become indispensable for all the mobile terminations. And the mobile phone should be provided with the bilateral function due to some demands, for instance, making a call while performing data transfer.

However, with the reduction in size of mobile termination, and in order to satisfy the wireless transmissions with the different protocols, a plurality of antenna devices shall be installed in a limited space, which makes it more difficult to design the antennas. As the interference between the antennas is serious, the communication performance of the antennas is affected.

SUMMARY OF THE INVENTION

The object of this invention is to provide a device for improving the stray isolation between the antennas in the bilateral antenna, which solves the above technical problems.

The other object of this invention is to provide a method for improving the stray isolation between the antennas in the bilateral antenna.

The technical problems solved by this invention can be achieved by the following technical solution:

A device for improving the stray isolation between the antennas in the bilateral antenna, wherein it comprises: a plurality of communication modules which include an antenna and a power amplification module; at least one of the communication modules further comprises a tuning module; the power amplification module is directly connected to the antenna or is connected to the antenna through the tuning module; and the stray isolation between each communication module comprising the tuning module and the other communication modules is increased by adjusting the communication module comprising the tuning module.

Preferably, the tuning module is an analogy continuously tunable tuning module or a digital controlled stepping tunable tuning module.

Preferably, a tunable capacitor array consisting of a plurality of tunable capacitor units is adopted in the tuning module.

Preferably, the maximum capacitance of the tunable capacitor array is 32 pF; the minimum capacitance of the tunable capacitor array is 0.5 pF; and the capacitance stepping value is 0.5 pF.

Preferably, the antenna of one of the communication modules and the antennas of the other communication modules work in different frequencies.

Preferably, the antenna of one of the communication modules and the antennas of the other communication modules work in a same communication system or different communication system.

Preferably, one of the communication modules and the other communication modules are applied to different antenna system.

Preferably, the antenna of the communication module is an antenna of multi-communication frequency band or single-communication frequency band.

Preferably, wherein each of the communication modules is separately provided with the tuning module.

A method for improving the stray isolation between the antennas in the bilateral antenna, wherein the method is applied to the device as disclosed above, the antennas of at least two communication frequency bands are adopted in the communication module; the at least two communication frequency bands include a first communication frequency band and a second communication frequency band; when the communication module works in the first communication frequency band, the signal output by the communication module comprises a certain stray power in the second communication frequency band, meanwhile the signal output in the second communication frequency band further comprises a certain stray power in the first communication frequency band; the standing wave of the communication module in second communication frequency band is deteriorated by adjusting the tuning module connected to the communication module.

This invention deteriorates the standing wave of the communication module in the second communication frequency band by adjusting the tuning module connected to the communication module, which would not influence the standing wave of the communication module in the first communication frequency band substantially. Consequently the stray power of the first communication frequency band is deteriorated, and then the power of the second communication frequency band fed by the communication module is decreased. The power of the second communication frequency band coupled to the other communication module is decreased, i.e., the stray isolation between the communication module and other communication modules can be increased.

The advantageous effects of the invention are those as follows: this invention increases the stray isolation between the communication modules in different frequency bands, specifically, when a long interval exits between working frequency bands. Consequently, the radiance performance of the bilateral antenna of the mobile termination can be satisfied, and the capacity of resisting disturbance between the systems can be enhanced.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

The present invention will be further illustrated in combination with the following figures and embodiments, but it should not be deemed as limitation of the present invention.

Figure 1:
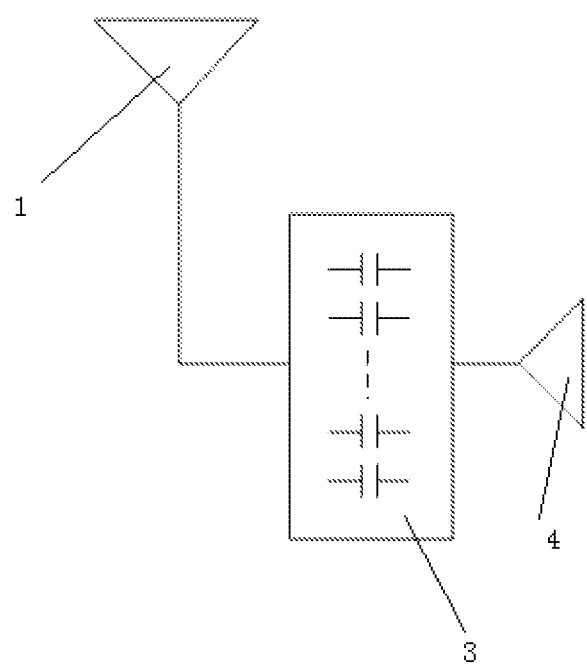
FIG. 1 illustrates a diagram of the connection of a single-communication module of the present invention.

Referring to FIG. 1, a device for improving the stray isolation between the antennas in the bilateral antenna comprises a plurality of communication modules which include Antenna 1 and Power Amplification Module 4; at least one of the communication modules further comprises Tuning Module 3; Power Amplification Module 4 is connected to Antenna 1 directly or is connected to Antenna 1 through Tuning Module 3. The stray isolation among the communication modules is improved by adjusting Tuning Module 3. An analogy continuously tunable tuning module or a digital controlled stepping tunable tuning module is adopted in Tuning Module 3. A tunable capacitor array consisting of a plurality of tunable capacitor units is adopted in Tuning Module 3, and in another embodiment, an adjustable inductance array consisting of a plurality of tunable inductor units is adopted in Tuning Module 3. The maximum capacitance of the tunable capacitor array is 32 pF, the minimum capacitance is 0.5 pF, and the capacitance stepping is 0.5 pF. The antenna of one of the communication modules and the antenna of the other communication modules work in different frequencies.

Furthermore, each of the communication modules is provided with Tuning Module 3 separately.

Figure 2:
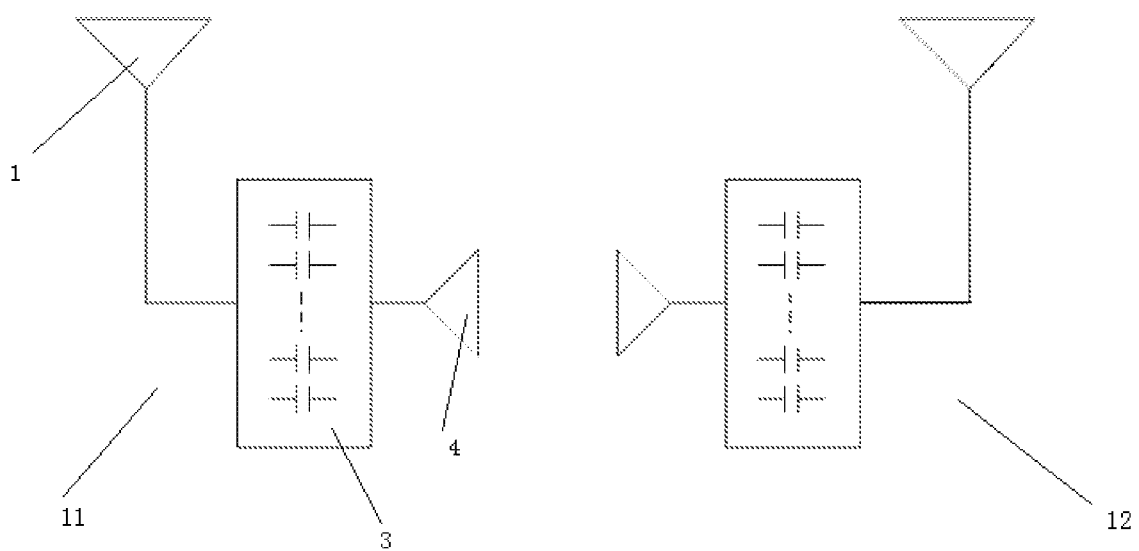
FIG. 2 illustrates a diagram of two communication modules of the present invention.

Referring to FIG. 2, a method for improving the stray isolation between the antennas in the bilateral antenna will be illustrated below: any two of the communication modules, such as First Communication Module 11 and Second Communication Module 12, are selected. A tuning module is included in First Communication Module 11, and the antennas of at least two communication frequency bands are adopted in the Communication Module 11. At least two of the communication frequency bands include a first communication frequency band and a second communication frequency band. When First Communication Module 11 works in the first communication frequency band, a certain stray power in the second communication frequency band is included in the signal output by First Communication Module 11. Meanwhile, a certain stray power in the first communication frequency band is included in the signal output by the second communication frequency band. The standing wave of First Communication Module 11 in the second communication frequency band is deteriorated by adjusting the tuning module connected to First Communication Module 11. The power of the second communication frequency band coupled to Second Communication Module 12 is decreased. The stray isolation between First Communication Module 11 and Second Communication Module 12 is increased.

This invention deteriorates the standing wave of First Communication Module 11 in the second communication frequency band, by the way of adjusting the tuning module connected to First Communication Module 11, and there is little influence on the standing wave of First Communication Module 11 in the first communication frequency band. Thereby due to the standing wave of the second communication frequency band, the stray power of the first communication frequency band is deteriorated, and then the power of the second communication frequency band fed by First Communication Module 11 is decreased. The power of the second communication frequency band coupled to Second Communication Module 12 is decreased, i.e., the stray isolation between First Communication Module 11 and Second Communication Module 12 is increased.

In one preferred embodiment of the invention, First Communication Module 11 works in GSM system. The first communication frequency band is EGSM900, and the second communication frequency band is DCS1800. Second Communication Module 12 works in GSM system and TD-SCDMA system, an antenna of multi-communication frequency band is adopted in Second Communication Module 12. The communication frequency bands of Second Communication Module 12 comprises USGSM850, EGSM900, DCS1800, PCS1900, TD-SCDMA Band A, TD-SCDMA Band F. The antennas of First Communication Module 11 and Second Communication Module 12 are connected to the tunable capacitor array separately. The tunable capacitor array consists of a plurality of tunable capacitors. The maximum capacitance of the tunable capacitor array is 32 pF, the minimum capacitance of the tunable capacitor array is 0.5 pF, and the capacitance stepping is 0.5 pF. When First Communication Module 11 works in EGSM900, and when Second Communication Module 12 works in DCS1800, the signal output by EGSM900 contains lots of stray power in the frequency band of DCS 1800, meanwhile the signal output by the signal output by DCS1800 contains lots of stray power in the frequency band of EGSM900. The tunable capacitor array in First Communication Module 11 is adjusted separately, the standing wave of First Communication Module 11 in the frequency band of DCS1800 is deteriorated, and it takes little influence on the standing wave of First Communication Module 11 in EGSM900 frequency band. Consequently, due to the standing wave of DSC1800 frequency band, the stray power of EGSM900 frequency band is deteriorated, and then the power of DSC1800 frequency band fed by First Communication Module 11 is decreased. The power of DSC1800 frequency band coupled to Second Communication Module 12 is decreased, i.e., the stray isolation from First Communication Module 11 to Second Communication Module 12 is increased.

An antenna of single-communication frequency band may further be adopted in First Communication Module 11 and Second Communication Module 12. This invention is applied that First Communication Module 11 and Second Communication Module 12 work in different communication system, and the present invention is also applied that First Communication Module 11 and Second Communication Module 12 work in the same communication system. According to a preferred embodiment, First Communication Module 11 and Second Communication Module 12 may work in different communication frequency bands.

Preferably, First Communication Module 11 and Second Communication Module 12 are applied to different antenna systems, such as, 2 G/3 G/4 G, BT, WIFI or GPS.

The descriptions of the present invention have been presented are preferred embodiments, but are not intended to be exhaustive or limited to the embodiments disclosed. It is apparent for the skilled in the art that any equivalent replacement and obvious changes according to the specification and drawings of this invention shall be included.

What is claimed is:

1. A device for improving the stray isolation between the antennas in the bilateral antenna, wherein it comprises: a plurality of communication modules which include an antenna and a power amplification module; at least one of the communication modules further comprises a tuning module; the power amplification module is directly connected to the antenna or is connected to the antenna through the tuning module; and the stray isolation between each communication module comprising the tuning module and the other communication modules is increased by adjusting the communication module comprising the tuning module.

2. The device as disclosed in claim 1, wherein the tuning module is an analogy continuously tunable tuning module or a digital controlled stepping tunable tuning module.

3. The device as disclosed in claim 2, wherein a tunable capacitor array consisting of a plurality of tunable capacitor units is adopted in the tuning module.

4. The device as disclosed in claim 3, wherein the maximum capacitance of the tunable capacitor array is 32 pF; the minimum capacitance of the tunable capacitor array is 0.5 pF; and the capacitance stepping value is 0.5 pF.

5. The device as disclosed in claim 1, wherein the antenna of one of the communication modules and the antennas of the other communication modules work in different frequencies.

6. The device as disclosed in claim 1, wherein the antenna of one of the communication modules and the antennas of the other communication modules work in a same communication system or different communication system.

7. The device as disclosed in claim 1, wherein one of the communication modules and the other communication modules are applied to different antenna system.

8. The device as disclosed in claim 1, wherein the antenna of the communication module is an antenna of multi-communication frequency band or single-communication frequency band.

9. The device as disclosed in claim 1, wherein each of the communication modules is separately provided with the tuning module.

10. A method for improving the stray isolation between the antennas in the bilateral antenna, wherein the method is applied to the device comprising a plurality of communication modules which include an antenna and a power amplification module; at least one of the communication modules further comprises a tuning module; the power amplification module is directly connected to the antenna or is connected to the antenna through the tuning module; and the stray isolation between each communication module comprising the tuning module and the other communication modules is increased by adjusting the communication module comprising the tuning module;

the antennas of at least two communication frequency bands are adopted in the communication module; the at least two communication frequency bands include a first communication frequency band and a second communication frequency band; when the communication module works in the first communication frequency band, the signal output by the communication module comprises a certain stray power in the second communication frequency band, meanwhile the signal output in the second communication frequency band further comprises a certain stray power in the first communication frequency band; the standing wave of the communication module in second communication frequency band is deteriorated by adjusting the tuning module connected to the communication module.

11. The method as disclosed in claim 10, wherein the tuning module is an analogy continuously tunable tuning module or a digital controlled stepping tunable tuning module.

12. The method as disclosed in claim 11, wherein a tunable capacitor array consisting of a plurality of tunable capacitor units is adopted in the tuning module.

13. The method as disclosed in claim 12, wherein the maximum capacitance of the tunable capacitor array is 32 pF; the minimum capacitance of the tunable capacitor array is 0.5 pF; and the capacitance stepping value is 0.5 pF.

14. The method as disclosed in claim 10, wherein the antenna of one of the communication modules and the antennas of the other communication modules work in different frequencies.

15. The method as disclosed in claim 10, wherein the antenna of one of the communication modules and the antennas of the other communication modules work in a same communication system or different communication system.

16. The method as disclosed in claim 10, wherein one of the communication modules and the other communication modules are applied to different antenna system.

17. The method as disclosed in claim 10, wherein the antenna of the communication module is an antenna of multi-communication frequency band or single-communication frequency band.

18. The method as disclosed in claim 10, wherein each of the communication modules is separately provided with the tuning module.

* * * * *